US009467794B2

(12) United States Patent
Kim et al.

(10) Patent No.: US 9,467,794 B2
(45) Date of Patent: Oct. 11, 2016

(54) METHOD AND SYSTEM FOR AUDIO CHANNEL SETUP

(71) Applicant: Samsung Electronics Co., Ltd., Gyeonggi-do (KR)

(72) Inventors: Hyungeun Kim, Gyeonggi-do (KR); Sungjae Park, Seoul (KR); Jongcheol Seol, Gyeonggi-do (KR); Donghee Yoo, Incheon (KR)

(73) Assignee: Samsung Electronics Co., Ltd (KR)

( * ) Notice: Subject to any disclaimer, the term of this patent is extended or adjusted under 35 U.S.C. 154(b) by 122 days.

(21) Appl. No.: 14/475,150

(22) Filed: Sep. 2, 2014

(65) Prior Publication Data

US 2015/0063588 A1 Mar. 5, 2015

(30) Foreign Application Priority Data

Aug. 30, 2013 (KR) ........................ 10-2013-0104125

(51) Int. Cl.
*H04B 3/00* (2006.01)
*H04S 7/00* (2006.01)
*H04R 5/02* (2006.01)

(52) U.S. Cl.
CPC ................. *H04S 7/301* (2013.01); *H04R 5/02* (2013.01); *H04R 2205/024* (2013.01); *H04R 2420/07* (2013.01); *H04R 2499/11* (2013.01)

(58) Field of Classification Search
None
See application file for complete search history.

(56) References Cited

U.S. PATENT DOCUMENTS

2011/0245944 A1 10/2011 Louboutin
2014/0213226 A1* 7/2014 Filev ..................... H04W 4/023 455/414.1
2014/0358985 A1* 12/2014 Kotecha .............. H04L 65/1063 709/202
2015/0098576 A1* 4/2015 Sundaresan ............ H04R 29/00 381/58

* cited by examiner

*Primary Examiner* — Thang Tran
(74) *Attorney, Agent, or Firm* — The Farrell Law Firm, P.C.

(57) ABSTRACT

A method and system for audio channel setup for an electronic device connected with one or more external electronic devices is provided. The method includes configuring audio channel information for the electronic device and the one or more external electronic devices, determining whether a master device is changed between the electronic device and one or more external electronic devices, and sending, when the master device is changed, the configured audio channel information to a new master device.

13 Claims, 13 Drawing Sheets

METHOD AND SYSTEM FOR AUDIO CHANNEL SETUP

PRIORITY

This application claims priority under 35 U.S.C. §119(a) to a Korean Patent Application Serial No. 10-2013-0104125, which was filed on Aug. 30, 2013 in the Korean Intellectual Property Office, the entire disclosure of which is incorporated herein by reference.

BACKGROUND

1. Field of Invention

The present invention relates generally to a method and system for setting up an audio channel between wirelessly connected electronic devices.

2. Description of Related Art

Modern electronic devices, such as a smartphone, tablet personal computer, Portable Multimedia Player (PMP), Personal Digital Assistant (PDA) and laptop personal computer, and wearable devices, such as a wrist watch and Head-Mounted Display (HMD), support not only call handling functions, but also other functions related to, for example, games, Social Networking Services (SNS), Internet access, multimedia, still and moving images, and music playback.

It is possible to wirelessly interconnect electronic devices, establish an audio channel between the devices, and reproduce sounds using the audio channel.

However, after an audio channel is established between electronic devices using a conventional method, it is difficult to change the settings of the audio channel when an electronic device is moved or is detached from the audio channel.

SUMMARY

The present invention has been made to address at least the above-mentioned problems and/or disadvantages and to provide at least the advantages described below. Accordingly, an aspect of the present invention is to provide a method and system for audio channel setup for an electronic device connected with one or more external electronic devices.

In accordance with an aspect of the present invention, an audio channel setup method is provided. The audio channel setup method includes configuring audio channel information for the electronic device and one or more external electronic devices, determining whether a master device is changed between the electronic device and the one or more external electronic devices, and sending, when the master device is changed, the configured audio channel information to a new master device.

In accordance with another aspect of the present invention, a audio channel setup method is provided. The audio channel setup method includes configuring audio channel information for the electronic device and one or more external electronic devices, checking whether a position of the electronic device is moved, a master device is changed between the electronic device and external electronic devices, at least one of the one or more external electronic devices is disconnected from the electronic device, or at least one of the one ore more external electronic devices is newly connected to the electronic device, and reconfiguring or sending the configured audio channel information when the position of the electronic device is moved, the master device is changed between the electronic device and the one or more external electronic devices, at least one of the one or more external electronic devices is disconnected from the electronic device, or at least one of the one or more external electronic devices is newly connected to the electronic device.

In accordance with another aspect of the present invention, a system for audio channel setup is provided. The audio channel setup system includes an electronic device, and one or more external electronic devices, wherein the electronic device is connected with the one or more external electronic devices, is designated as a master device, identifies positions of the one or more external electronic devices, configures audio channel information, and checks whether a master device designation is changed, and where the one or more external electronic devices are designated as slave devices so that audio channel settings and volume settings thereof are controlled by the electronic device.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention are described in detail with reference to the accompanying drawings. Various specific details are included to assist in understanding but these are to be regarded as merely exemplary. Those skilled in the art will recognize that various changes and modifications of the embodiments described herein can be made without departing from the scope and spirit of the present invention. The same reference symbols are used throughout the drawings to refer to the same or like parts.

Figure 1:
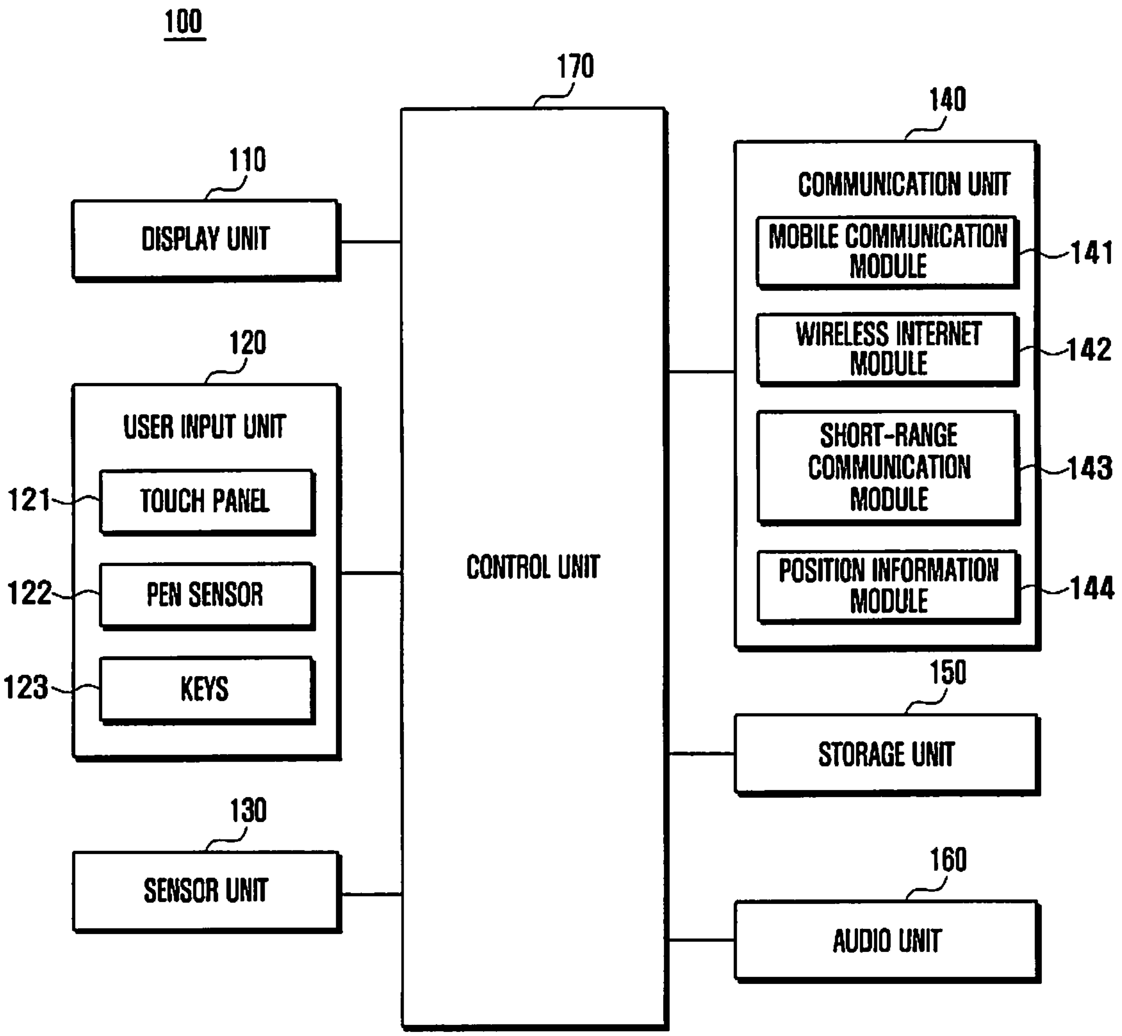
FIG. 1 is a block diagram of an electronic device, according to an embodiment of the present invention.

FIG. 1 is a block diagram of an electronic device, according to an embodiment of the present invention.

Referring to FIG. 1, the electronic device 100 is described as a representative one of multiple electronic devices 100, 101, 102, 103, 104, and 105, which have identical or similar configurations.

In various embodiments of the present invention, the electronic devices include a smartphone, a tablet computer, a Portable Multimedia Player (PMP), a Personal Digital Assistant (PDA), a laptop computer, and a wearable device such as a wrist watch and Head-Mounted Display (HMD).

The electronic device 100 includes a display unit 110, a user input unit 120, a sensor unit 130, a communication unit 140, a storage unit 150, an audio unit 160, and a control unit 170.

The display unit 110 is configured to display images or data for the user. The display unit 110 includes a display panel. The display panel may be a Liquid-Crystal Display (LCD) or an Active-Matrix Organic Light-Emitting Diode (AMOLED) display. The display unit 110 further includes a controller to control the display panel. The display panel may be configured to be flexible, transparent or wearable.

The display unit 110 may be combined with a touch panel 121 to form a touchscreen. For example, such a touchscreen may include a display panel and a touch panel stacked together as an integrated module.

The user input unit 120 is configured to receive various user commands. The user input unit 120 includes one or more of a touch panel 121, a pen sensor 122 and keys 123.

The touch panel 121 recognizes a user touch input using capacitive, resistive, infrared or ultrasonic technology. The touch panel 121 includes a controller. When the touch panel 121 is a capacitive type, it recognizes not only direct touch input, but also proximity input. The touch panel 121 may further include a tactile layer to present a tactile response to the user. The pen sensor 122 is realized using a pen recognition sheet and is manipulated in a manner similar to the touch panel 121. The keys 123 include mechanical keys and touch keys. For example, the mechanical keys include a power button formed at one side of the electronic device 100 for turning on the display unit 110, a volume button formed at another side thereof for volume adjustment, and a home button formed at the center of the lower end of the display unit 110 for restoring the home screen. The touch keys include a menu key formed at one portion of the lower end of the display unit 110 for presenting menu items related to the currently displayed screen, and a cancel key formed at another portion of the lower end of the display unit 110 for returning to the previous screen.

The sensor unit 130 includes a gyro sensor, an acceleration sensor, and the like. In one embodiment, the sensor unit 130 senses the position of the electronic device 100 in three-dimensional space and sends the sensed position information to the control unit 170, which is then aware of the position of the electronic device 100 in three-dimensional space.

The communication unit 140 includes one or more of a mobile communication module 141, a wireless Internet module 142, a short-range communication module 143, and a position information module 144.

The mobile communication module 141 sends and receives radio signals to and from a base station, an external terminal, or a server on a mobile communication network. The radio signals include various types of data corresponding to a voice call, a video call, and a text or multimedia message.

The wireless Internet module 142 is used for wirelessly accessing the Internet. Technologies such as Wi-Fi (Wireless Local Area Network (WLAN)), Wireless Broadband (WiBro), Worldwide Interoperability for Microwave Access (WiMAX), and High Speed Downlink Packet Access (HSDPA) is utilized for wireless Internet access.

The short-range communication module 143 is used for short-range communication. Technologies such as Bluetooth, Radio Frequency Identification (RFID), Infrared Data Association (IrDA), Ultra Wideband (UWB) and ZigBee may be utilized for short-range communication.

The position information module 144 performs a function to acquire or identify the position of the electronic device 100. The position information module 144 obtains position information using a Global Navigation Satellite System (GNSS). The term "GNSS" refers to a system of satellites that revolve around the Earth and transmit reference signals enabling specific electronic receivers to determine their geo-spatial positions. Systems, such as the Global Positioning System (GPS, USA), the Galileo system (European Union), the Global Orbiting Navigational Satellite System (GLONASS, Russia), the COMPASS system (China), and the Quasi-Zenith Satellite System (QZSS, Japan) are regarded as a GNSS.

The communication unit 140 may further include a network interface or modem (e.g. LAN card) to enable the electronic device 100 to communicate with various networks, such as the Internet, a Local Area Network (LAN), a Wide Area Network (WAN), a telecommunication network, a cellular network, a satellite network, and a Public Switched Telephone Network (PSTN).

The communication unit 140 may be aware of the position of the electronic device 100 using position information generated by the position information module 144. The control unit 170 identifies the position of the electronic device 100 in three-dimensional space on the basis of position information generated by the position information module 144.

The electronic device 100 uses the communication unit 140 to identify relative positions of other electronic devices 101, 102, 103, 104, and 105. For example, relative positions between the electronic device 100 and other electronic devices 101, 102, 103, 104, and 105 are identified through measurement of Received Signal Strength Indication (RSSI), Time of Arrival (ToA) or Time Difference of Arrival (TDOA).

The storage unit 150 may include at least one of an internal memory and an external memory.

The internal memory may be composed of a volatile memory (such as a dynamic random access memory (DRAM), static RAM (SRAM), or synchronous dynamic RAM (SDRAM)), a non-volatile memory (such as a programmable read only memory (PROM), one time programmable ROM (OTPROM), erasable programmable ROM (EPROM), electrically erasable programmable ROM (EEPROM), mask ROM, or flash ROM), a hard disk drive (HDD), and a solid-state drive (SSD). The control unit 170 loads instructions or data received from a non-volatile memory or another component onto a volatile memory for processing. The control unit 170 also saves data received from or generated by another component in a non-volatile memory for storage.

The external memory may be composed of a memory card (such as Compact Flash (CF), Secure Digital (SD), Micro Secure Digital (micro-SD), Mini Secure Digital (mini-SD), or extreme Digital (xD)) and a memory stick.

The storage unit 150 stores an operating system (OS) for controlling the operation of the electronic device 100 and the application programs for user functions. The operating system includes a kernel, middleware, APIs, and the like.

Examples of operating systems include Android, iOS, Windows, Symbian, Tizen and Bada. The storage unit 150 stores audio channel settings configured by the control unit 170, or stores weights or priorities needed for audio channel setup as a database.

The kernel of the operating system includes a resource manager, for resource management, and device drivers. The resource manager includes a process manager, a memory manager, a file system manager and the like, and performs control, allocation and release of system resources. The device drivers enable various components of the electronic device 100 to be accessed and controlled through software. To this end, each device driver is divided into an interface and a driver module provided by a hardware vendor. Examples of device drivers include a display driver, camera driver, Bluetooth driver, shared memory driver, USB driver, keypad driver, Wi-Fi driver, audio driver, and inter-process communication (IPC) driver.

The middleware is composed of multiple modules pre-implemented to support functions commonly needed by various applications. The middleware provides commonly needed functions through APIs so that limited system resources of the electronic device 100 may be efficiently utilized. Middleware includes at least one of an application manager, window manager, multimedia manager, resource manager, power manager, database manager, and package manager. The middleware may further include at least one of a connectivity manager, notification manager, location manager, graphics manager, and security manager, according to embodiments of the present invention. The middleware may include a runtime library and other libraries. The runtime library is a library module that is used by a compiler to add new functions through a programming language at runtime. For example, the runtime library may support functions related to input/output, memory management, and arithmetic computation. The middleware is extended by adding a new middleware module that is created by combining existing middleware modules together according to a new functionality. The middleware is composed of distinct modules specialized according to the operating system.

An application programming interface (API) refers to a set of application programming functions. APIs have different configurations according to operating systems. For example, in the case of Android or iOS, one API set may be provided on a platform basis; and in the case of Tizen, two or more API sets may be provided.

An application performs one or more functions using a corresponding application program. Applications may be divided into preloaded applications and third-party applications. Examples of applications include a home application supporting the home screen, Short Message Service (SMS) application, Multimedia Message Service (MMS) application, Instant Message (IM) application, browser application, camera application, alarm application, contacts application, voice dialing application, email application, calendar application, media player application, album application, and clock application. The storage unit 150 stores a variety of data generated by the communication unit 140, the user input unit 120, the audio unit 160 and the control unit 170.

The audio unit 160 converts an audio signal into an electrical signal and vice versa. For example, the audio unit 160 converts an audio signal from a microphone into an electrical signal for input or converts an electrical signal into an audio signal for output to a speaker, receiver, or earphone.

The control unit 170 executes the operating system and application programs, controls various hardware and software components, processes various data including multimedia, and performs various steps. The control unit 170 may be realized as a System-on-Chip (SoC), and further includes a graphics processing unit (GPU).

In one embodiment of the present invention, when the electronic device 100 is wirelessly connected with at least one of external electronic devices 101, 102, 103, 104, and 105, the control unit 170 identifies the position of the connected external electronic device relative to the position of the electronic device 100 on the basis of position information obtained through the sensor unit 130 and the communication unit 140. After connection establishment, the control unit 170 designates the electronic device 100 as a master device and designates the connected external electronic device as a slave device. When the electronic device 100 is designated as a master device, it controls an audio channel setting operation and volume control operation of the external electronic device designated as a slave device. The control unit 170 sets audio channel information of the electronic device 100 and the external electronic devices 101, 102, 103, 104, and 105. The control unit 170 sends sound information stored in the electronic device 100 to one or more of the external electronic devices 101, 102, 103, 104, and 105, according to the audio channel information. Here, the electronic device 100 sends sound information to one or more of the external electronic devices 101, 102, 103, 104, or 105 through the communication unit 140. The control unit 170 monitors movement in the position of the electronic devices 100, 101, 102, 103, 104, or 105, change in master designation of the electronic device 100, and disconnection of the external electronic device 101, 102, 103, 104, or 105 from the electronic device 100. When at least one of the electronic devices 100, 101, 102, 103, 104, and 105 is moved, when master designation of the electronic device 100 is changed, or when at least one of the external electronic devices 101, 102, 103, 104, and 105 is disconnected from the electronic device 100, the control unit 170 sends audio channel information to the external electronic devices 101, 102, 103, 104, and 105 or reconfigures the audio channel information.

For example, audio channel layout information as shown in Table 1 is stored as a database in the storage unit 150, and the control unit 170 configures the audio channel with reference to the database stored in the storage unit 150.

TABLE 1

| Audio channel | Channel designation |
|---|---|
| 2 channels | Left channel |
| | Right channel |
| 5.1 channels | Left channel |
| | Right channel |
| | Center channel |
| | Woofer channel |
| | Rear left channel |
| | Rear right channel |

Figure 2:
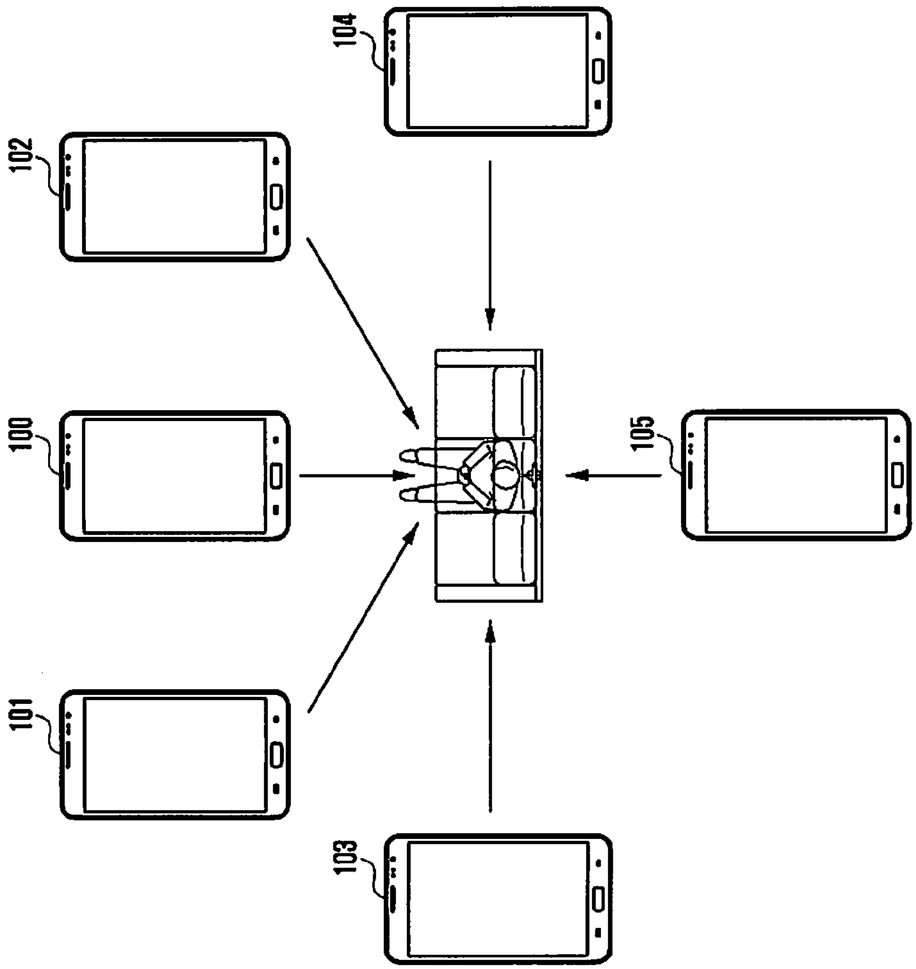
FIG. 2 illustrates an audio channel setup system, according to an embodiment of the present invention.

FIG. 2 illustrates an audio channel setup system, according to an embodiment of the present invention.

Referring to FIG. 2, when the electronic devices 100, 101, 102, 103, 104, and 105 are wirelessly interconnected, each device identifies its audio channel designation and produces sounds in a direction toward the user according to the audio channel designation. For example, in the case of a 5.1 channel layout, the audio channel is configured so that the electronic devices 101, 100 and 102 placed in front of the user act respectively as a left speaker, a center speaker and a right speaker, and the electronic devices 103, 105 and 104 placed behind the user act respectively as a rear left speaker, a woofer and a rear right speaker. Here, when the electronic device 100 is designated as a master device and the other electronic devices 101, 102, 103, 104, and 105 are designated as slave devices, the electronic device 100, designated as the master device, configures and controls the audio channel of the electronic device 100 and the other electronic devices 101, 102, 103, 104, and 105 constituting the audio channel setup system.

When the electronic devices 100, 101, 102, 103, 104, and 105 are wirelessly interconnected, each device identifies its audio channel designation according to relative positions and automatically plays back sound information in a direction toward the user, according to the audio channel designation.

Figure 3A:
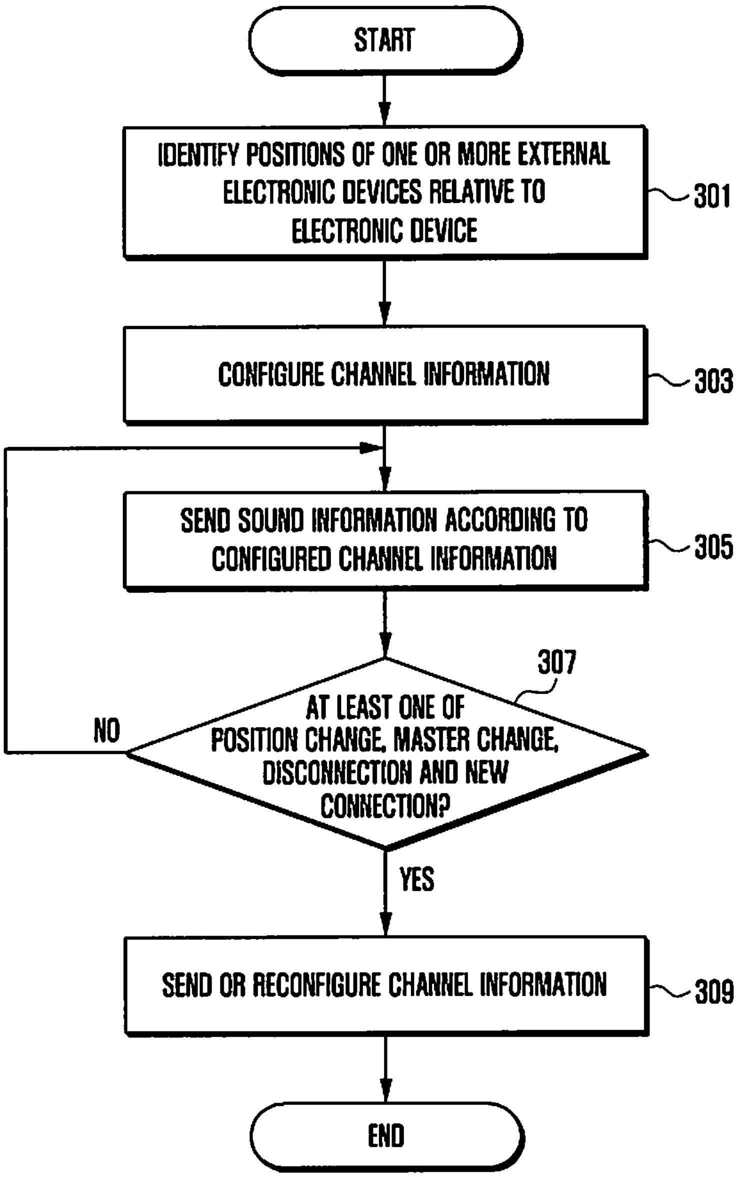
FIGS. 3A and 3B are flowcharts of an audio channel setup method, according to an embodiment of the present invention.

FIG. 3A is a flowchart of an audio channel setup method, according to an embodiment of the present invention.

Referring to FIG. 3A, at step 301, when external electronic devices 101, 102, 103, 104, and 105 are connected with the electronic device 100, the electronic device 100 determines positions of the external electronic devices 101, 102, 103, 104, and 105 relative to the position of the electronic device 100.

More specifically, when external electronic devices 101, 102, 103, 104, and 105 are wirelessly connected with the electronic device 100, the electronic device 100 designates itself as a master device and designates the external electronic devices 101, 102, 103, 104, and 105 as slave devices.

The electronic device 100 determines the position of the external electronic devices 101, 102, 103, 104, and 105 relative to the position of the electronic device 100 by use of the sensor unit 130 and the communication unit 140.

At step 303, the electronic device 100 configures audio channel information of the electronic device 100 and the external electronic devices 101, 102, 103, 104, and 105 connected thereto. The electronic device 100 configures audio channel information according to relative positions between the electronic devices 100, 101, 102, 103, 104, and 105.

For example, referring to FIG. 2, in the case of a 5.1 channel layout, the electronic device 100 can identify relative positions of the other electronic devices 101, 102, 103, 104, and 105 and configure audio channel information so that the electronic devices 101, 100, and 102 placed in front of the user act, respectively, as a left speaker, a center speaker and a right speaker, and the electronic devices 103, 105, and 104 placed behind the user act, respectively, as a rear left speaker, a woofer and a rear right speaker.

At steps 301 and 303, the electronic device 100 configures audio channel information according to user settings. For example, in the case of a 5.1 channel layout, the user can directly configure audio channel information so that the electronic devices 101, 100, and 102 placed in front of the user act, respectively, as a left speaker, a center speaker and a right speaker, and the electronic devices 103, 105, and 104 placed behind the user act, respectively, as a rear left speaker, a woofer and a rear right speaker.

At step 305, the electronic device 100 sends sound information to the external electronic devices 101, 102, 103, 104, and 105, according to the configured audio channel information. The electronic device 100 sends sound information to the external electronic devices 101, 102, 103, 104, and 105 through the communication unit 140. Here, the sound information is a play list stored in the electronic devices 100, 101, 102, 103, 104, and 105, and the play list indicates a sound playback sequence. The electronic devices 100, 101, 102, 103, 104, and 105 plays back sound source materials, according to the sound information.

At step 307, the electronic device 100 checks whether at least one of the electronic devices 100, 101, 102, 103, 104, and 105 is moved, master designation of the electronic device 100 is changed, at least one of the external electronic devices 101, 102, 103, 104, and 105 is disconnected from the electronic device 100, or a new external electronic device is connected to the electronic device 100.

If at least one of the electronic devices 100, 101, 102, 103, 104, and 105 is moved, if master designation of the electronic device 100 is changed, if at least one of the external electronic devices 101, 102, 103, 104, and 105 is disconnected from the electronic device 100, or if a new external electronic device is connected to the electronic device 100, the electronic device 100 proceeds to step 309 at which the electronic device 100 sends new audio channel information to the connected external electronic devices or reconfigures the audio channel information. The audio channel information indicates audio channel designation as used in, for example, 5.1 channel layout.

Otherwise, the electronic device 100 returns to step 305 and the electronic device 100 sends sound information to the external electronic devices 101, 102, 103, 104, and 105, according to the configured audio channel information.

Figure 3B:
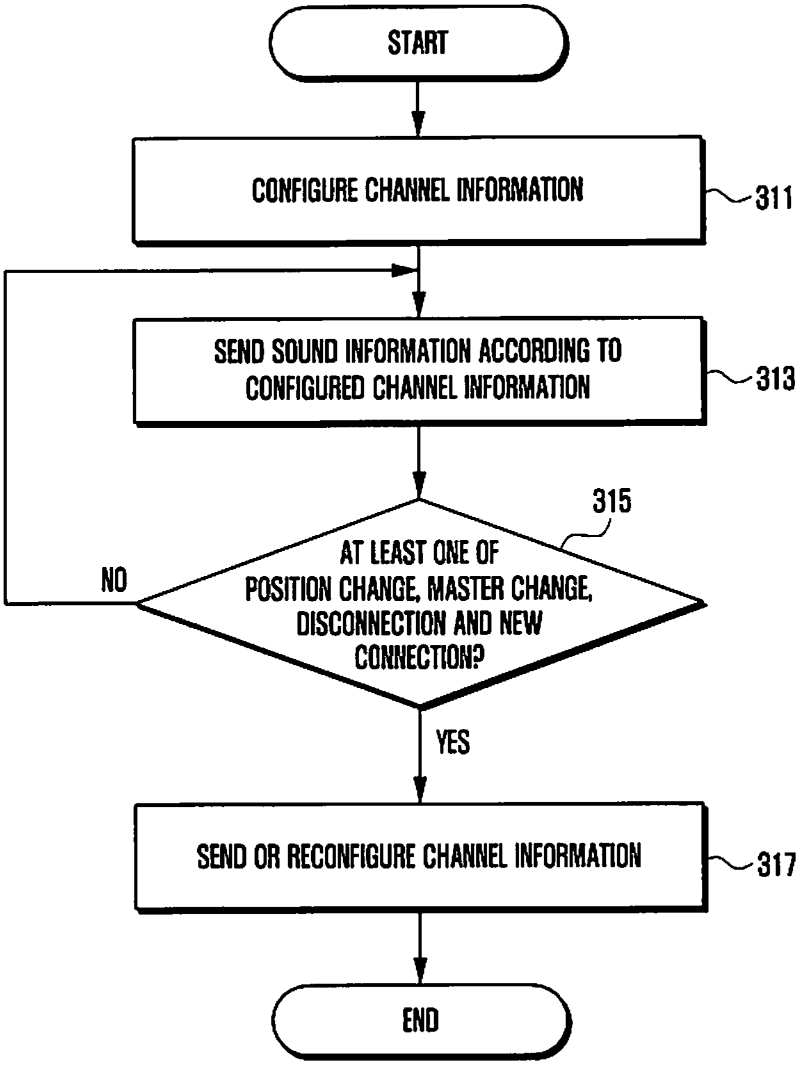

FIG. 3B is a flowchart of an audio channel setup method according to an embodiment of the present invention. The audio channel setup method is described with reference to FIGS. 2 and 3B.

Referring to FIG. 3B, at step 311, when external electronic devices 101, 102, 103, 104, and 105 are wirelessly connected with the electronic device 100, the electronic device 100 configures audio channel information. The electronic device 100 configures audio channel information of the electronic device 100 and the external electronic devices 101, 102, 103, 104, and 105 connected thereto according to identified positions.

For example, referring to FIG. 2, in the case of a 5.1 channel layout, the electronic device 100 can identify relative positions of the other electronic devices 101, 102, 103, 104, and 105 and configure audio channel information so that the electronic devices 101, 100, and 102 placed in front of the user act, respectively, as a left speaker, a center speaker and a right speaker, and the electronic devices 103, 105, and 104 placed behind the user act, respectively, as a rear left speaker, a woofer and a rear right speaker.

At step 311, the electronic device 100 configures and sends audio channel information according to user settings. For example, in the case of a 5.1 channel layout, the user can directly configure audio channel information so that the electronic devices 101, 100, and 102 placed in front of the user act, respectively, as a left speaker, a center speaker and a right speaker, and the electronic devices 103, 105, and 104 placed behind the user act, respectively, as a rear left speaker, a woofer and a rear right speaker.

At step 313, the electronic device 100 sends sound information to the external electronic devices 101, 102, 103, 104, and 105, according to the configured audio channel information. The electronic device 100 sends sound information to the external electronic devices 101, 102, 103, 104, and 105 through the communication unit 140. Here, the sound information is a play list stored in the electronic devices 100, 101, 102, 103, 104, and 105, and the play list indicates a sound playback sequence.

At step 315, the electronic device 100 checks whether at least one of the electronic devices 100, 101, 102, 103, 104, and 105 is moved, master designation of the electronic device 100 is changed, at least one of the external electronic devices 101, 102, 103, 104, and 105 is disconnected from the electronic device 100, or a new external electronic device is connected to the electronic device 100.

If at least one of the electronic devices 100, 101, 102, 103, 104, and 105 is moved, if master designation of the electronic device 100 is changed, if at least one of the external electronic devices 101, 102, 103, 104, and 105 is disconnected from the electronic device 100, or if a new external electronic device is connected to the electronic device 100, the electronic device 100 proceeds to step 317 at which the electronic device 100 sends new audio channel information to the connected external electronic devices or reconfigures the audio channel information. The audio channel information indicates audio channel designation as used in, for example, 5.1 channel layout.

Otherwise, the electronic device returns to step 313 and the electronic device 100 sends sound information to the external electronic devices 101, 102, 103, 104, and 105, according to the configured audio channel information.

Figure 4:
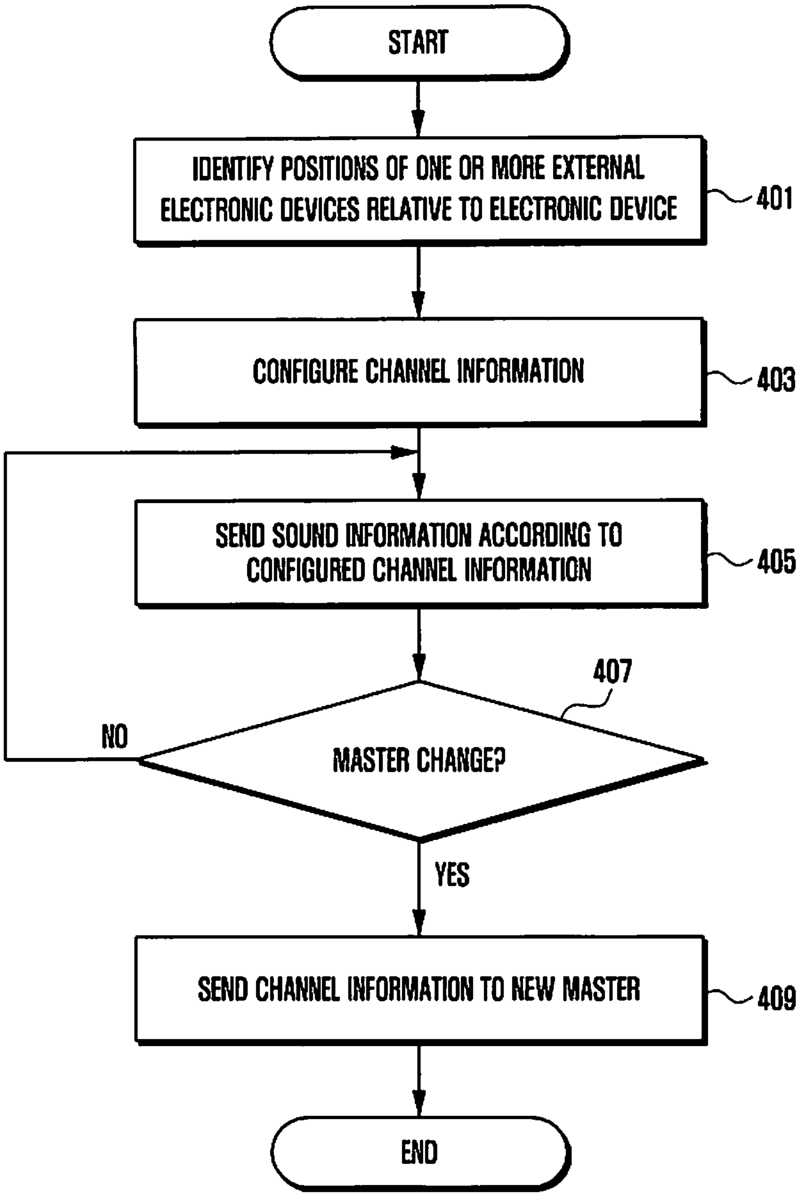
FIG. 4 is a flowchart of an audio channel setup method, according to another embodiment of the present invention.

FIG. 4 is a flowchart of an audio channel setup method, according to another embodiment of the present invention.

Figure 9:
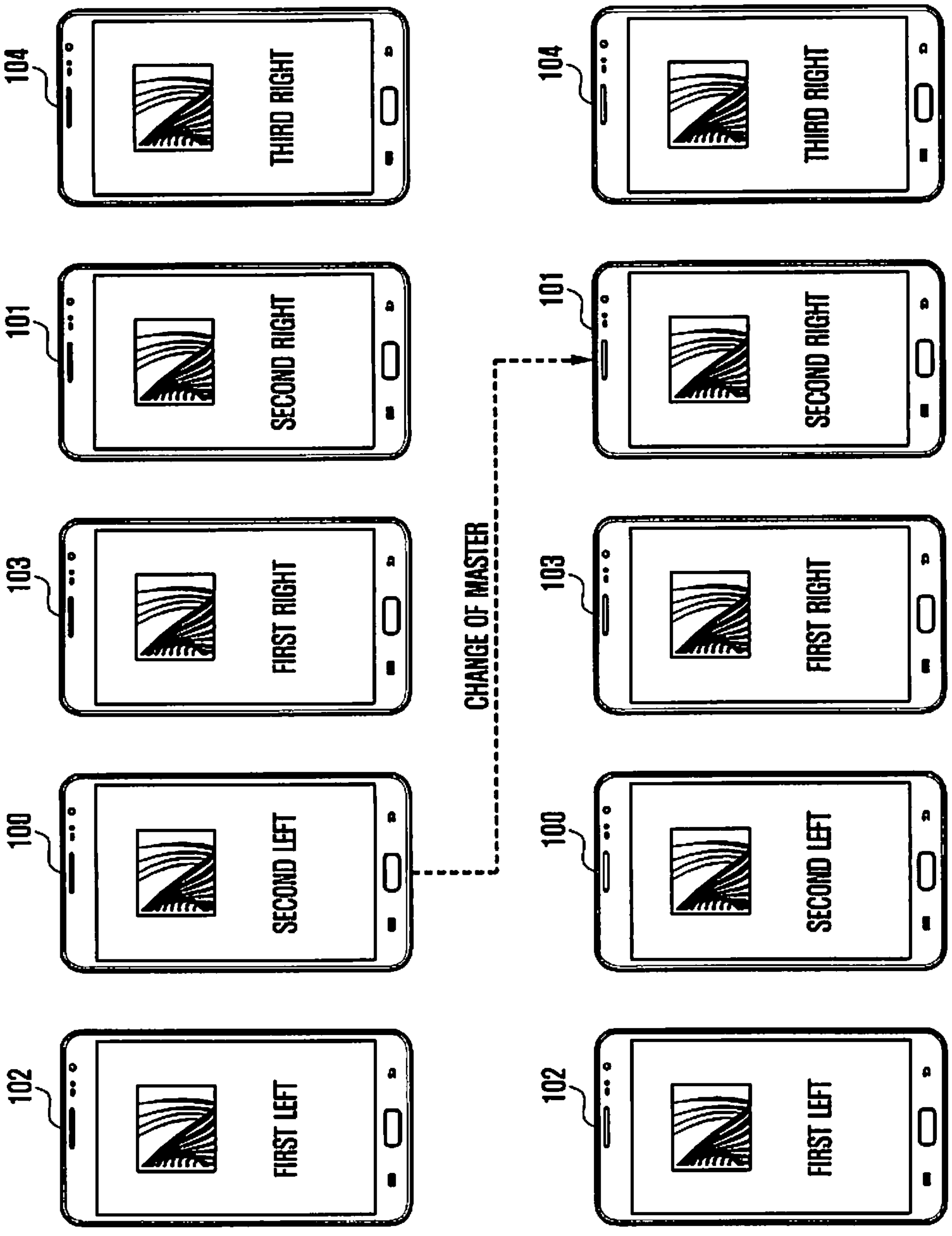
FIG. 9 illustrates audio channel setup, according to an embodiment of the present invention.

FIG. 9 illustrates audio channel setup, according to an embodiment of the present invention.

Referring to FIGS. 4 and 9, FIG. 9 illustrates audio channel setup corresponding to the flowchart of FIG. 4. The audio channel setup method herein is described with reference to FIGS. 4 and 5.

Referring to FIG. 4, at step 401, when external electronic devices 101, 102, 103, and 104 are wirelessly connected with the electronic device 100, the electronic device 100 determines positions of the external electronic devices 101, 102, 103 and 104, relative to the position of the electronic device 100.

More specifically, when the external electronic devices 101, 102, 103, and 104 are wirelessly connected with the electronic device 100, the electronic device 100 acts as a master device and designate the external electronic devices 101, 102, 103, and 104 as slave devices.

At step 401, the electronic device 100 determines positions of the external electronic devices 101, 102, 103, and 104 relative to the position of the electronic device 100 by use of the sensor unit 130 and the communication unit 140. Here, not only relative positions between the electronic device 100 and the external electronic devices 101, 102, 103, and 104, but also relative positions between the external electronic devices 101, 102, 103, and 104, are determined.

After connection establishment, at step 403, the electronic device 100 configures audio channel information of the electronic device 100 and the external electronic devices 101, 102, 103, and 104 connected thereto. The electronic device 100 configures audio channel information according to the identified relative positions between the electronic devices 100, 101, 102, 103, and 104.

At steps 401 and 403, the electronic device 100 sends and configures audio channel information according to user settings. For example, in the case of a 5.1 channel layout, the user can directly configure audio channel information so that the electronic devices 101, 100, and 102 placed in front of the user act, respectively, as a left speaker, a center speaker and a right speaker, and the electronic devices 103, 105, and 104 placed behind the user act, respectively, as a rear left speaker, a woofer and a rear right speaker.

As an example for step 403, referring to FIG. 9, in the case of a 5 channel layout, the electronic device 100, before master device change, can identify relative positions between the electronic devices 100, 101, 102, 103, and 104 and configure audio channel information so that the electronic devices 102, 100, 103, 101, and 104 act as a first left speaker, a second left speaker, a first right speaker, a second right speaker and a third right speaker, respectively.

At step 405, the electronic device 100 sends sound information to the external electronic devices 101, 102, 103, and 104, according to the configured audio channel information. The electronic device 100 sends sound information to the external electronic devices 101, 102, 103, and 104 through the communication unit 140.

At step 407, the electronic device 100 checks whether one of the external electronic devices 101, 102, 103, and 104 is newly designated as a master device.

If one of the external electronic devices 101, 102, 103, and 104 is newly designated as a master device, the electronic device 100 proceeds to step 409 at which the electronic device 100 sends the audio channel information to the external electronic device newly designated as a master device.

Otherwise, the electronic device returns to step 405 and the electronic device 100 sends sound information to the external electronic devices 101, 102, 103, and 104, according to the configured audio channel information.

For example, referring to FIG. 9, when the external electronic device 101 among the external electronic device 101, 102, 103, and 104 is newly designated as a master device, the electronic device 100 sends the audio channel information to the external electronic device 101.

Figure 5:
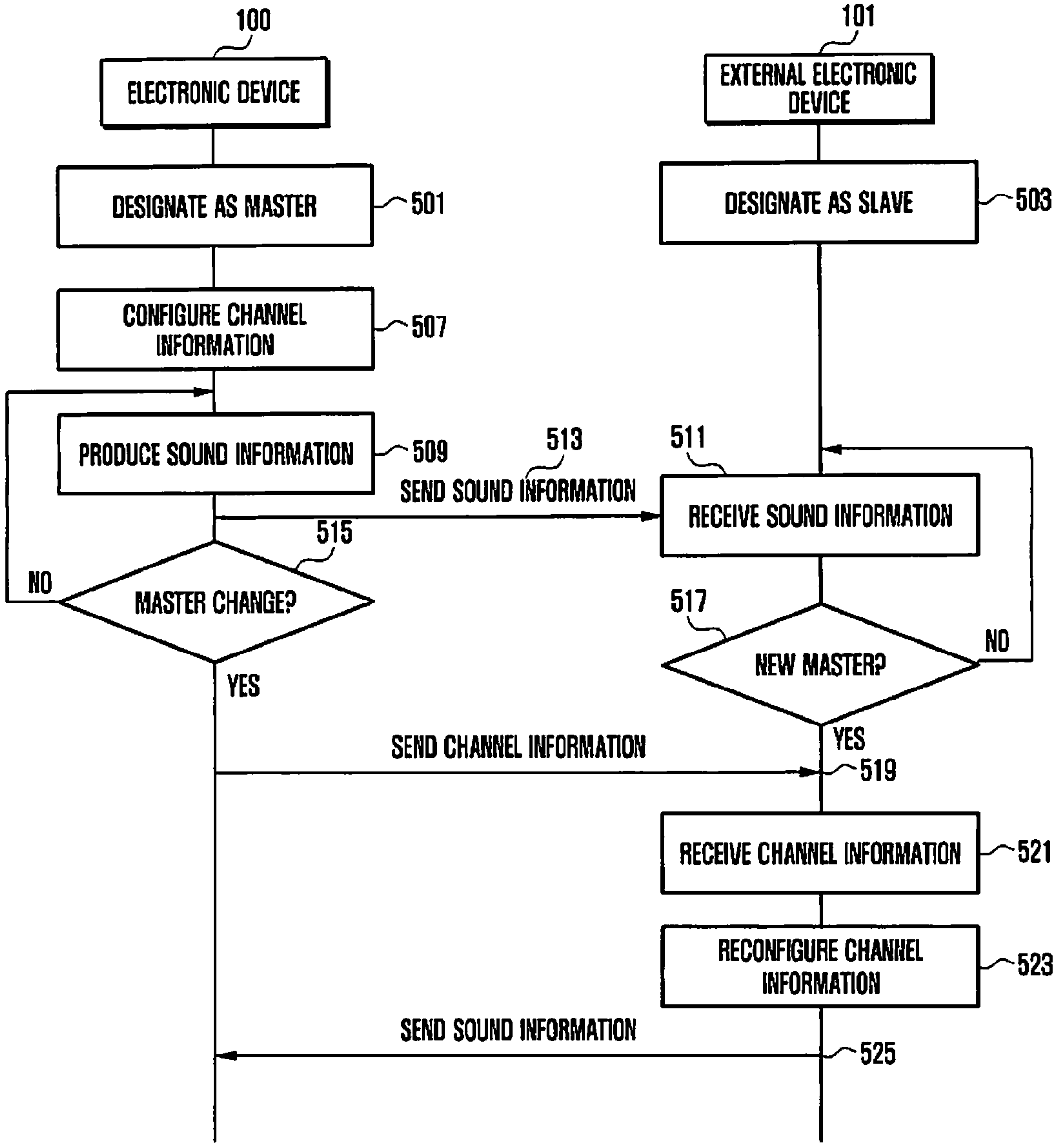
FIG. 5 is a sequence diagram of an audio channel setup method, according to another embodiment of the present invention.

FIG. 5 is a sequence diagram of an audio channel setup method, according to another embodiment of the present invention. The audio channel setup method is described herein with reference to FIGS. 4, 5 and 9.

Referring to FIG. 4, at step 501, when an external electronic device 101 is wirelessly connected with the electronic device 100, the electronic device 100 is designated as a master device. Thereafter, at step 503, the external electronic device 101 is designated as a slave device. The external electronic device 101, designated as a slave device, is controlled by the electronic device 100.

After wireless connection establishment, at step 507, the electronic device 100 configures audio channel information. The electronic device 100 configures audio channel information according to the identified relative positions between the electronic devices 100 and 101. Here, step 507 is skipped when the user directly configures the audio channel information.

At step 509, the electronic device 100 produces sound information, according to the configured audio channel information. At step 513, the electronic device 100 sends the sound information to the external electronic device 101. At step 511, the external electronic device 101 receives the sound information.

At step 515, the electronic device 100 checks whether master device designation is changed. Correspondingly, at step 517, the external electronic device 101 checks whether the external electronic device 101 is newly designated as a master device. If master device designation is changed, the electronic device 100 proceeds to step 519 at which the electronic device 100 sends the audio channel information to the external electronic device 101. If master device designation is not changed, the electronic device 100 returns to step 509 and produces sound information, according to the configured audio channel information.

If the external electronic device 101 is newly designated as a master device, the external electronic device 101 proceeds to step 521 at which it receives the audio channel information. The external electronic device 101 newly designated as a master device controls the electronic device 100. If the external electronic device 101 is not newly designated as a master device, the external device 101 returns to step 511 and receives the sound information.

At step 523, the external electronic device 101 reconfigures the audio channel information relative to the position of the external electronic device 101. This is to change the audio channel designation with reference to the position of the master device. At step 525, the external electronic device 101 sends sound information to the electronic device 100, according to the reconfigured audio channel information.

For example, referring to FIG. 9, when the external electronic device 101 among the external electronic device 101, 102, 103, and 104 is newly designated as a master device, the electronic device 100 sends the audio channel information to the external electronic device 101 newly designated as a master device. The external electronic device 101 acting as a new master device reconfigures the audio channel information relative to the position of the master device. Although interactions between one master device and one slave device are shown in FIG. 5, the above description may also be applied to interactions between one master device and multiple slave devices.

Figure 6:
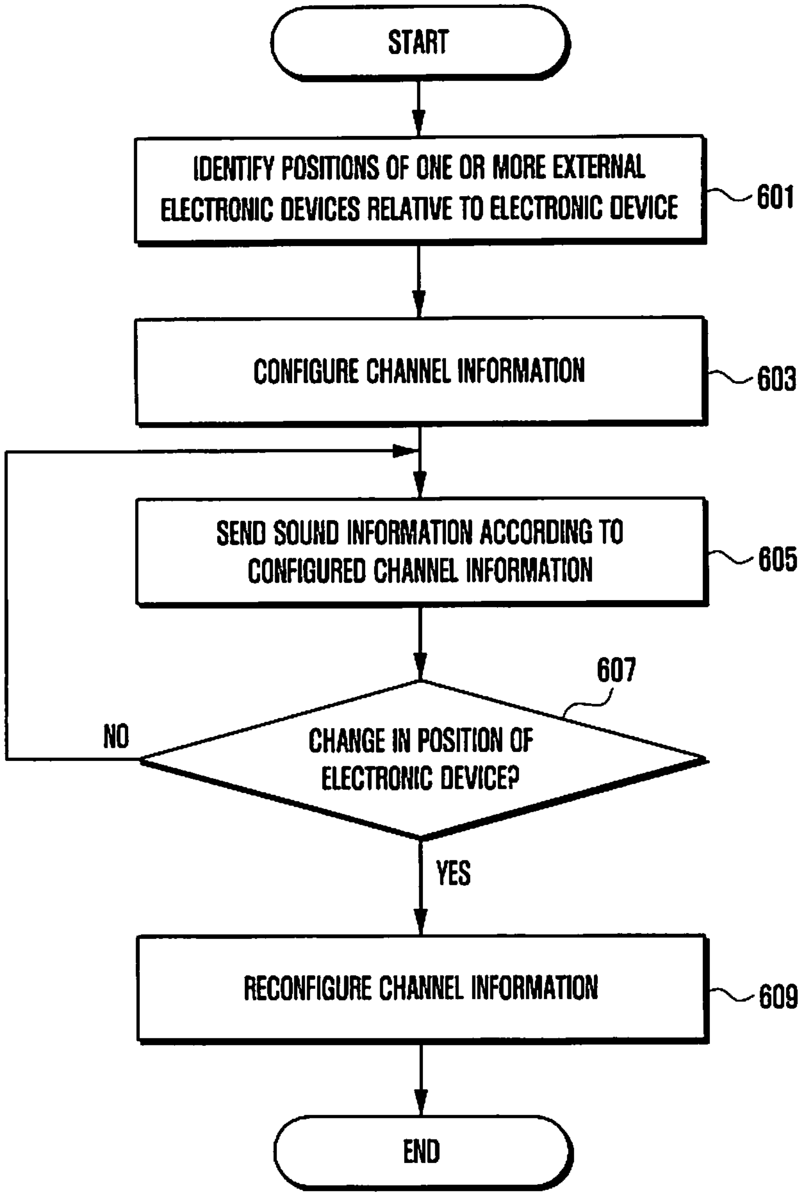
FIG. 6 is a flowchart of an audio channel setup method, according to another embodiment of the present invention.

FIG. 6 is a flowchart of an audio channel setup method, according to another embodiment of the present invention.

Figure 10:
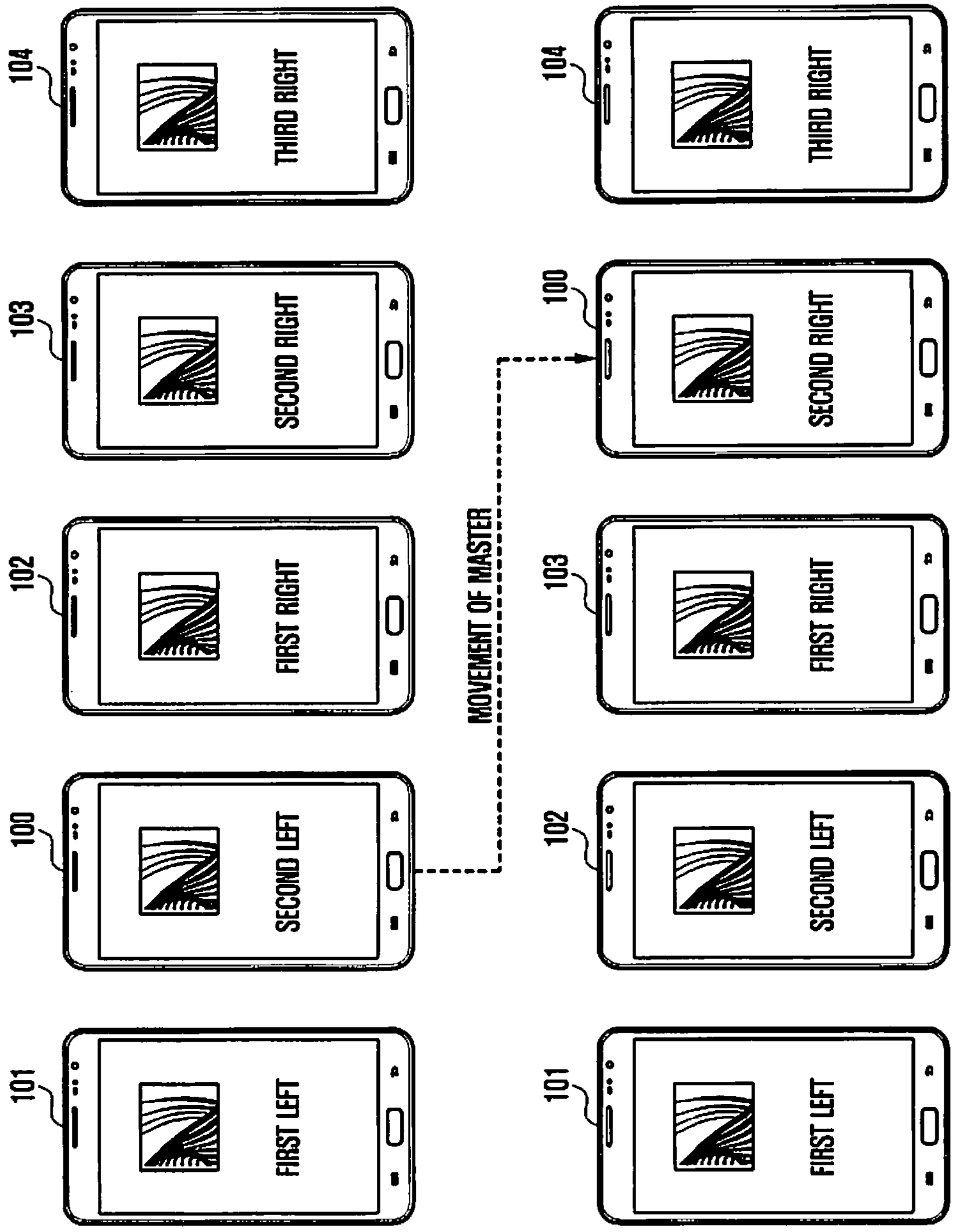
FIG. 10 illustrates audio channel setup, according to an embodiment of the present invention.

FIG. 10 illustrates audio channel setup, according to an embodiment of the present invention.

Referring to FIGS. 6 and 10, FIG. 10 illustrates audio channel setup corresponding to the flowchart of FIG. 6. The audio channel setup method is described herein with reference to FIGS. 6 and 10.

At step 601, when external electronic devices 101, 102, 103, and 104 are wirelessly connected with the electronic device 100, the electronic device 100 determines positions of the external electronic devices 101, 102, 103, and 104 relative to the position of the electronic device 100.

More specifically, when the external electronic devices 101, 102, 103, and 104 are wirelessly connected with the electronic device 100, the electronic device 100 designates itself as a master device and designates the external electronic devices 101, 102, 103, and 104 as slave devices.

At step 601, the electronic device 100 determines positions of the external electronic devices 101, 102, 103, and 104 relative to the position of the electronic device 100 by use of the sensor unit 130 and the communication unit 140. Here, not only relative positions between the electronic device 100 and the external electronic devices 101, 102, 103, and 104 but also relative positions between the external electronic devices 101, 102, 103 and 104 are determined.

After wireless connection establishment, at step 603, the electronic device 100 configures audio channel information. Here, the electronic device 100 configures audio channel information according to the identified relative positions between the electronic devices 100, 101, 102, 103, and 104.

For example, referring to FIG. 10, in the case of a 5 channel layout, the electronic device 100, before master device change, can identify relative positions between the electronic devices 100, 101, 102, 103, and 104 and configure audio channel information so that the electronic devices 101, 100, 102, 103, and 104 act as a first left speaker, a second left speaker, a first right speaker, a second right speaker and a third right speaker, respectively.

At step 605, the electronic device 100 sends sound information to the external electronic devices 101, 102, 103, and 104, according to the configured audio channel information. The electronic device 100 sends sound information to the external electronic devices 101, 102, 103, and 104 through the communication unit 140.

At step 607, the electronic device 100 checks whether the position of the electronic device 100 is changed. If the position of the electronic device 100 is changed, the electronic device 100 proceeds to step 609 at which the electronic device 100 reconfigures the audio channel information relative to the new position thereof. If the position of the electronic device 100 is not changed, the electronic device 100 returns to step 605 and sends sound information to the external electronic devices 101, 102, 103, and 104, according to the configured audio channel information.

For example, referring to FIG. 10, when the electronic device 100 is moved to the position of the external electronic device 103, the electronic device 100 reconfigures the audio channel information relative to the new position of the electronic device 100. The electronic device 100 can identify relative positions between the electronic devices 100, 101, 102, 103, and 104 and reconfigure the audio channel information so that the electronic devices 101, 102, 103, 100, and 104 act as a first left speaker, a second left speaker, a first right speaker, a second right speaker and a third right speaker, respectively.

Figure 7:
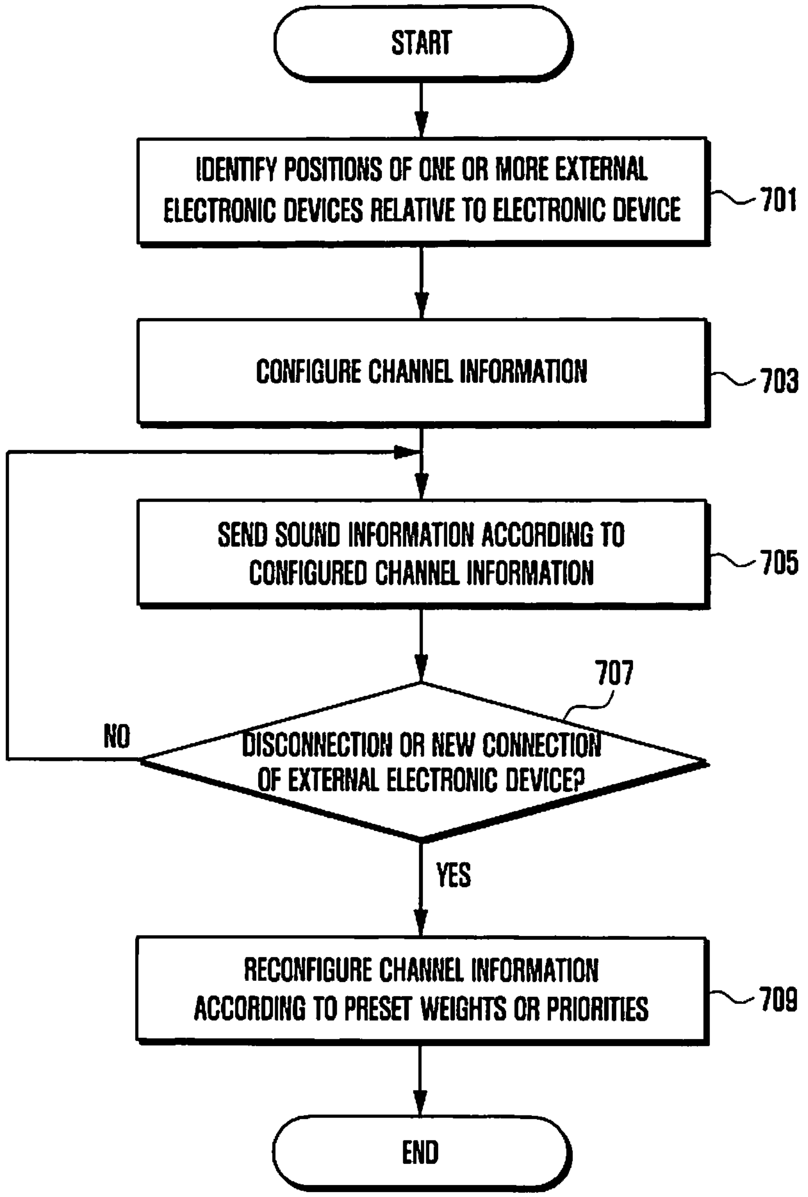
FIG. 7 is a flowchart of an audio channel setup method, according to another embodiment of the present invention.
Figure 11:
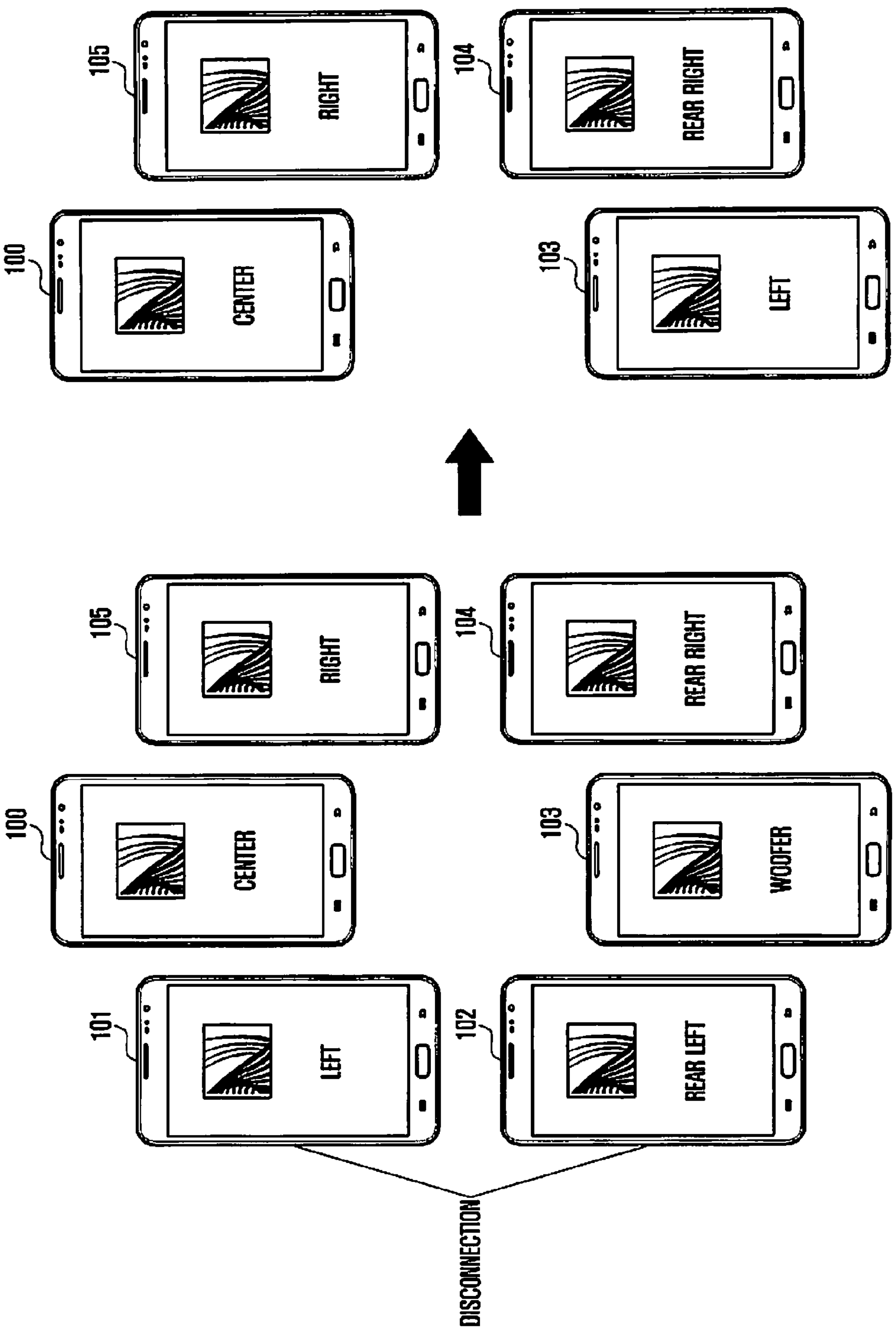
FIG. 11 illustrates audio channel setup, according to an embodiment of the present invention.

FIG. 7 is a flowchart of an audio channel setup method according to another embodiment of the present invention. FIG. 11 illustrates audio channel setup, according to an embodiment of the present invention.

Referring to FIGS. 7 and 11, FIG. 11 illustrates audio channel setup corresponding to the flowchart of FIG. 7. The audio channel setup method is described with reference to FIGS. 7 and 11.

At step 701, when external electronic devices 101, 102, 103, 104, and 105 are wirelessly connected with the electronic device 100, the electronic device 100 determines positions of the external electronic devices 101, 102, 103, 104, and 105 relative to the position of the electronic device 100.

More specifically, when external electronic devices 101, 102, 103, 104, and 105 are wirelessly connected with the electronic device 100, the electronic device 100 designates itself as a master device and designates the external electronic devices 101, 102, 103, 104, and 105 as slave devices.

The electronic device 100 determines the position of the external electronic devices 101, 102, 103, 104, and 105 relative to the position of the electronic device 100 by use of the sensor unit 130 and the communication unit 140 at step 701. Here, not only relative positions between the electronic device 100 and the external electronic devices 101, 102, 103, 104, and 105 but also relative positions between the external electronic devices 101, 102, 103, 104, and 105 are determined.

At step 703, the electronic device 100 configures audio channel information of the electronic device 100 and the external electronic devices 101, 102, 103, 104, and 105 connected thereto. The electronic device 100 configures audio channel information according to the relative positions between the electronic devices 100, 101, 102, 103, 104 and 105.

For example, referring to FIG. 11, in the case of a 5.1 channel layout, the electronic device 100 can identify relative positions of the electronic devices 100, 101, 102, 103, 104, and 105 and configure audio channel information so that the electronic devices 100, 101, 102, 103, 104, and 105 act as a center speaker, a left speaker, a rear left speaker, a woofer, a rear right speaker, and a right speaker, respectively. Here, steps 701 and 703 may be skipped when the user directly configures the audio channel information.

At step 705, the electronic device 100 sends sound information to the external electronic devices 101, 102, 103, 104, and 105 according to the configured audio channel information. The electronic device 100 sends sound information to the external electronic devices 101, 102, 103, 104, and 105 through the communication unit 140.

At step 707, the electronic device 100 checks whether at least one of the external electronic devices 101, 102, 103, 104, and 105 is disconnected from the electronic device 100 or at least one external electronic device is newly connected to the electronic device 100. If at least one of the external electronic devices 101, 102, 103, 104, and 105 is disconnected or at least one external electronic device is newly connected, the electronic device 100 proceeds to step 709 at which the electronic device 100 reconfigures the audio channel information with respect to the position of the electronic device 100, according to preset weights or priorities. Otherwise, the electronic device 100 returns to step 705 and sends sound information to the external electronic devices 101, 102, 103, 104, and 105, according to the configured audio channel information.

During reconfiguration of the audio channel information, a channel with broad sound distribution may take a heavy weighting or high priority. For example, speakers (or channels) may be listed in order of highest to lowest priority: center speaker (center channel), left/right speaker (left/right channel), rear left/right speaker (rear left/right channel), and woofer speaker (woofer channel). Hence, when an external electronic device designated to act as the center speaker (center channel) or the left/right speaker (left/right channel) with broad sound distribution is disconnected, the electronic device 100 performs audio channel reconfiguration. On the contrary, when an external electronic device designated to act as the center speaker (center channel) or the left/right speaker (left/right channel) with broad sound distribution is neither disconnected nor newly connected, the electronic device 100 does not perform audio channel reconfiguration. Alternatively, weights or priorities may be determined according to the number of right channels and the number of left channels. For example, when a given number or more of external electronic devices designated to act as a left channel or right channel are disconnected or newly connected, the electronic device 100 performs audio channel reconfiguration to achieve even sound distribution. Otherwise, the electronic device 100 does not perform audio channel reconfiguration.

As another example, referring to FIG. 11, when one or more external electronic devices are disconnected or newly connected (for instance, external electronic devices 101 and 102, designated to act, respectively, as the left channel and the rear left channel, are disconnected), the electronic device 100 reconfigures the audio channel information with respect to the position of the electronic device 100 according to preset weights or priorities. In this case, the electronic device 100 changes audio channel designation so that, among the remaining external electronic devices 103, 104 and 105, the external electronic device being designated to act as the woofer channel with low priority is newly designated to act as the left channel (which has been deleted).

Figure 8:
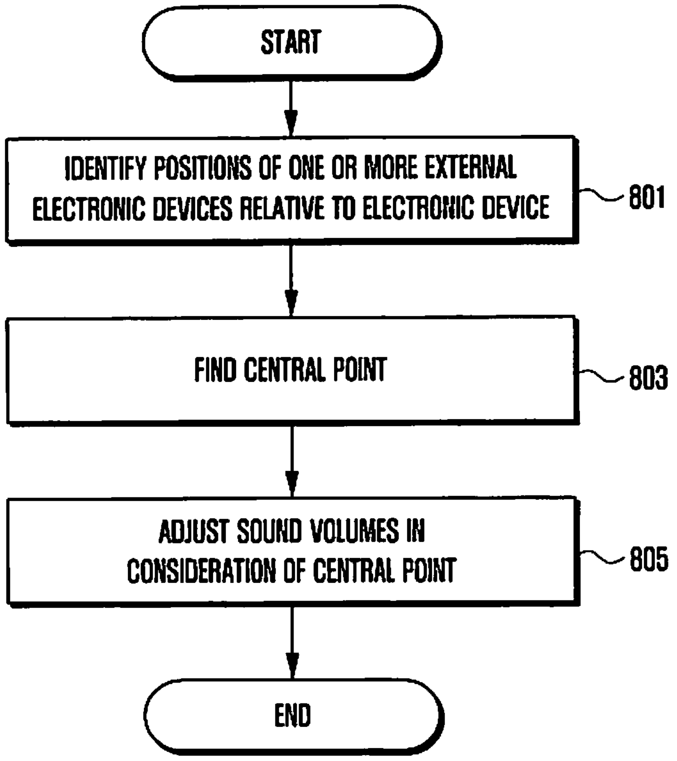
FIG. 8 is a flowchart of an audio channel setup method, according to another embodiment of the present invention.
Figure 12:
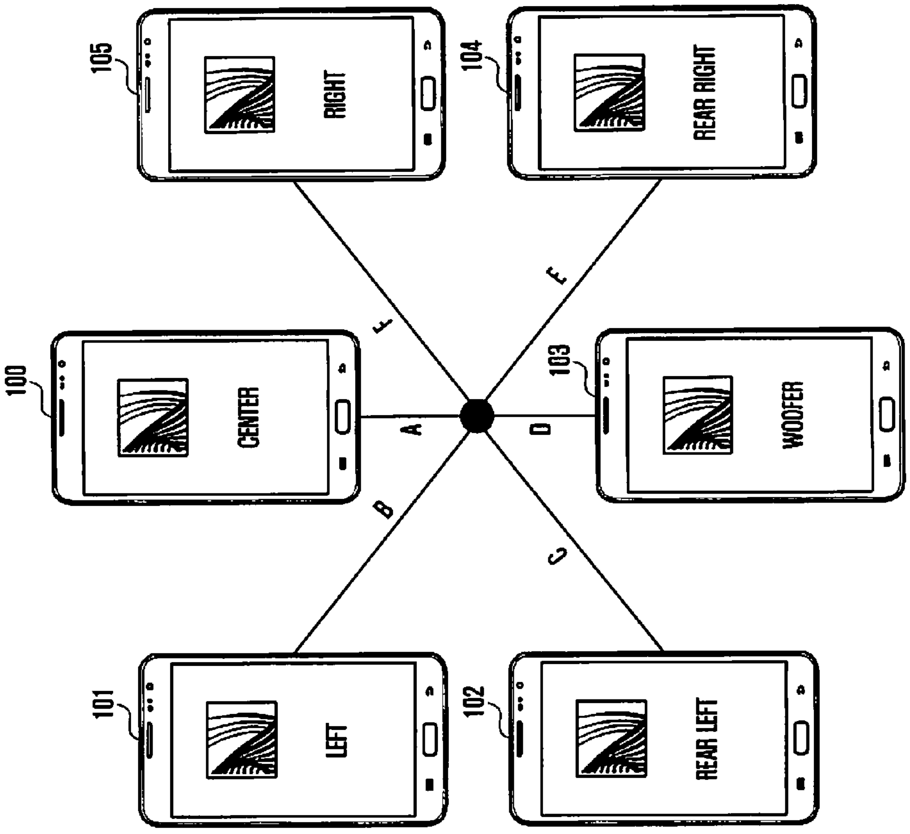
FIG. 12 illustrates audio channel setup, according to an embodiment of the present invention.

FIG. 8 is a flowchart of an audio channel setup method, according to another embodiment of the present invention. FIG. 12 illustrates audio channel setup, according to an embodiment of the present invention.

Referring to FIGS. 8 and 12, FIG. 12 illustrates audio channel setup corresponding to the flowchart of FIG. 8.

At step 801, when external electronic devices 101, 102, 103, 104, and 105 are wirelessly connected with the electronic device 100, the electronic device 100 determines positions of the external electronic devices 101, 102, 103, 104, and 105 relative to the position of the electronic device 100.

More specifically, when external electronic devices 101, 102, 103, 104, and 105 are wirelessly connected with the electronic device 100, the electronic device 100 designates itself as a master device and designates the external electronic devices 101, 102, 103, 104, and 105 as slave devices. The electronic device 100 determines the positions of the external electronic devices 101, 102, 103, 104, and 105 relative to the position of the electronic device 100 by use of the sensor unit 130 and the communication unit 140 at step 701. Here, not only are relative positions between the electronic device 100 and the external electronic devices 101, 102, 103, 104, and 105 determined, but also relative positions between the external electronic devices 101, 102, 103, 104, and 105.

At step 803, the electronic device 100 configures audio channel information and finds a central point between the electronic devices 100, 101, 102, 103, 104, and 105. Here, the central point is the center of gravity of the electronic devices 100, 101, 102, 103, 104, and 105.

At step 805, the electronic device 100 adjusts sound volumes of the electronic devices 100, 101, 102, 103, 104, and 105 so that sounds are evenly spread from the electronic devices 100, 101, 102, 103, 104, and 105 toward the central point.

For example, referring to FIG. 12, distances between the central point and the electronic devices 100, 101, 102, 103, 104, and 105 are denoted, respectively, as A, B, C, D, E and F. When A, B, C, D, E and F are very different from each other, if all the electronic devices 100, 101, 102, 103, 104, and 105 produce sounds at the same volume without regard to their distances to the central point, sound quality at the central point may be poor or uneven. Hence, when the electronic device 100 determines the central point, as described above, and adjusts sound volumes of the electronic devices constituting the audio channel, in proportion to their distances to the central point, sound quality can be improved at the central point.

Various embodiments of the present invention have been shown and described for the purpose of illustration without limiting the subject matter of the present invention. It should be understood by those skilled in the art that many variations and modifications of the method and apparatus, described herein, will still fall within the spirit and scope of the present invention as defined in the appended claims and their equivalents.

What is claimed is:

1. A method of audio channel setup for an electronic device connected with one or more external electronic devices, the method comprising:

identifying positions of the one or more external electronic devices relative to a position of the electronic device;

configuring audio channel information for the electronic device and the one or more external electronic devices based on the position of the electronic device and the positions of the one or more external electronic devices;

after configuring the audio channel information, determining whether a master device is changed between the electronic device and the one or more external electronic devices; and sending, when the master device is changed, the configured audio channel information to a new master device.

2. The method of claim 1, further comprising sending sound information to the one or more external electronic devices, according to the configured audio channel information.

3. The method of claim 1, further comprising designating the electronic device as the master device and designating the one or more external electronic devices as slave devices, when the one or more external electronic devices are connected with the electronic device.

4. The method of claim 3, wherein the master device controls audio channel settings and volume settings of the slave devices.

5. A method of audio channel setup for an electronic device connected with one or more external electronic devices, the method comprising:

identifying positions of the one or more external electronic devices relative to a position of the electronic device;

configuring audio channel information for the electronic device and the one or more external electronic devices based on the position of the electronic device and positions of the one or more external electronic devices;

after configuring the audio channel information, checking whether a master device is changed between the electronic device and the one or more external electronic devices; and reconfiguring the configured audio channel information, when the master device is changed between the electronic device and the one or more external electronic devices.

6. The method of claim 5, wherein reconfiguring the configured audio channel information comprises reconfiguring, when the position of the electronic device is moved, the configured audio channel information with reference to a new position of the electronic device.

7. The method of claim 5, wherein reconfiguring the configured audio channel information comprises reconfiguring, when at least one of the one or more external electronic devices is disconnected from the electronic device, the configured audio channel information with reference to the position of the electronic device, according to preset weights or priorities.

8. The method of claim 5, further comprising:

finding a central point between the electronic device and the one or more external electronic devices; and adjusting sound volumes of the electronic device and the one or more external electronic devices, in consideration of the central point.

9. The method of claim 8, wherein the central point corresponds to a center of gravity of the electronic device and the one or more external electronic devices.

10. A system for audio channel setup, comprising:

an electronic device; and one or more external electronic devices, wherein the electronic device is connected with the one or more external electronic devices, is designated as a master device, identifies positions of the one or more external electronic devices, configures audio channel information based on the identified positions, after configuring the audio channel information, checks whether the master device designation is changed, sends the configured audio channel information to a new master device when the master device designation is changed between the electronic device and the one or more external electronic devices, wherein the one or more external electronic devices are designated as slave devices so that audio channel settings and volume settings thereof are controlled by the electronic device, and wherein the new master device reconfigures the configured audio channel information with reference to the position of the new master device.

11. The system of claim 10, wherein the electronic device sends sound information to the one or more external electronic devices, according to the configured audio channel information.

12. The system of claim 10, wherein one of the one or more external electronic devices, designated as the new master device, receives the configured audio channel information.

13. An electronic device connected with one or more external electronic devices comprising:

a position information module for sensing a position of the electronic device;

a communication module; and a processor, wherein the processor is configured to:

identify positions of the one or more external electronic devices relative to the position of the electronic device;

configure audio channel information for the electronic device and the one or more external electronic devices based on the position of the electronic device and the positions of the one or more external electronic devices;

after configuring the audio channel information, determine whether a master device is changed between the electronic device and the one or more external electronic devices; and when the master device is changed, send the configured audio channel information to a new master device.

* * * * *